United States Patent
Kobayashi et al.

(10) Patent No.: US 7,904,205 B2
(45) Date of Patent: Mar. 8, 2011

(54) NETWORK OPENING METHOD IN MANUFACTURING ROBOTS TO A SECOND NETWORK FROM A FIRST NETWORK

(75) Inventors: Hirohiko Kobayashi, Fujiyoshida (JP); Yoshiharu Nagatsuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1060 days.

(21) Appl. No.: 11/385,824

(22) Filed: Mar. 22, 2006

(65) Prior Publication Data
US 2006/0217842 A1 Sep. 28, 2006

(30) Foreign Application Priority Data
Mar. 23, 2005 (JP) .................. 2005-083857

(51) Int. Cl.
*G05B 19/418* (2006.01)
(52) U.S. Cl. ......... 700/248; 700/245; 709/220; 709/221; 709/222
(58) Field of Classification Search .................... 700/61, 700/63, 54, 71, 250, 245, 248; 370/463, 370/362, 260, 397; 455/431; 709/217, 218, 709/220, 221, 222, 223, 224, 225, 226, 229, 709/249
See application file for complete search history.

(56) References Cited

U.S. PATENT DOCUMENTS

| | | | | |
|---|---|---|---|---|
| 5,329,528 A * | 7/1994 | Akai et al. | ................. | 370/445 |
| 5,586,259 A | 12/1996 | Kabe | | |
| 7,003,293 B2 * | 2/2006 | D'Annunzio | ................. | 455/431 |
| 7,292,900 B2 * | 11/2007 | Kreidler et al. | ................. | 700/83 |
| 7,525,274 B2 | 4/2009 | Kazi et al. | | |
| 7,603,289 B2 * | 10/2009 | Kriedler et al. | ................. | 705/26 |
| 7,609,714 B2 * | 10/2009 | Yamada et al. | ................. | 370/463 |
| 2002/0150249 A1 | 10/2002 | Ohkita et al. | | |
| 2003/0061384 A1 | 3/2003 | Nakatani | | |
| 2003/0069965 A1 * | 4/2003 | Ma et al. | ................. | 709/225 |
| 2004/0208184 A1 * | 10/2004 | Tanaka et al. | ................. | 370/397 |
| 2004/0210664 A1 * | 10/2004 | Prendergast | ................. | 709/230 |
| 2005/0004707 A1 * | 1/2005 | Kazi et al. | ................. | 700/245 |
| 2006/0179121 A1 * | 8/2006 | Kegoya et al. | ................. | 709/217 |

(Continued)

FOREIGN PATENT DOCUMENTS
EP 1458167 A1 9/2004
(Continued)

OTHER PUBLICATIONS

Notice of Reasons for Rejection for JP2005-083857 mailed Jul. 8, 2008. Inder S. Gopal et al., "Dynamic Address Assignment in Broadcast Networks," IEEE Transactions on Communications, Jan. 1986, No. 1, pp. 31-37.
EP Search Report for 06005649.6 mailed May 8, 2009.

*Primary Examiner* — Thomas G Black
*Assistant Examiner* — Sze-Hon Kong
(74) *Attorney, Agent, or Firm* — Lowe Hauptman Ham & Berner LLP

(57) ABSTRACT

A method of opening a network in a manufacturing system, the system including a plurality of robots, a plurality of robot controllers individually controlling the robots and a plurality of networks connecting the robot controllers with each other. The method includes the steps of opening a first network to the plurality of robot controllers, by setting, in each of the plurality of robot controllers, conditions, including addresses, required for opening the first network; designating an address range prepared in the first network for robot controllers to which a second network is opened and which is selected from among the plurality of robot controllers; and opening the second network to the robot controllers addressed within the address range designated in the first network, by setting, through the first network, conditions required for opening the second network.

8 Claims, 4 Drawing Sheets

U.S. PATENT DOCUMENTS

| | | | | |
|---|---|---|---|---|
| 2006/0208871 | A1* | 9/2006 | Hansen | 340/506 |
| 2007/0129826 | A1* | 6/2007 | Kreidler et al. | 700/83 |
| 2009/0144798 | A1* | 6/2009 | Ozog | 726/1 |
| 2010/0232429 | A1* | 9/2010 | Rao et al. | 370/389 |

FOREIGN PATENT DOCUMENTS

| | | |
|---|---|---|
| JP | 2002290418 | 10/2002 |
| JP | 2003084809 | 3/2003 |
| WO | 0076174 A1 | 12/2000 |

* cited by examiner

Fig.3

```
┌─────────────────────────────────────────────────┐ ─28
│ CONTROL NETWORK SETTING SCREEN      1/2         │
│                                                 │
│ SETTING MODE            :  LOCAL                │
│                                                 │
│ BAUD RATE               :  500 kbps             │
│ NUMBER OF INPUT BYTES   :  0 BYTE               │
│ NUMBER OF OUTPUT BYTES  :  0 BYTE               │
│                                                 │
│ ADDRESS                 :  1                    │
│                                                 │
│                                                 │
│                                                 │
│                              LOCAL      GLOBAL  │
└─────────────────────────────────────────────────┘
                                             30
```

Fig.4

```
┌─────────────────────────────────────────────────┐ ─28
│ CONTROL NETWORK SETTING SCREEN      2/2         │
│                                                 │
│ ADDRESS RANGE    :  192.168.0.1 -> 192.168.0.32 │
│ ADDRESS RULE     :  ORDER OF LEAST SIGNIFICANT  │
│                     DIGITS OF IP ADDRESSES      │
│ STARTING ADDRESS :  2                           │
│                                                 │
│                                                 │
│                                                 │
│                              LOCAL      GLOBAL  │
└─────────────────────────────────────────────────┘
```

Fig.5

```
CONTROL NETWORK SETTING SCREEN      1/2

SETTING MODE            :  GLOBAL

BAUD RATE               :  250 kbps
NUMBER OF INPUT BYTES   :  16 BYTES
NUMBER OF OUTPUT BYTES  :  16 BYTES

ADDRESS                 :  1

SAME SETTING    ADDRESS SETTING      LOCAL      GLOBAL
```

Fig.6

```
CONTROL NETWORK SETTING SCREEN      1/2

SETTING MODE            :  GLOBAL

BAUD RATE               :  250 kbps
NUMBER OF INPUT BYTES   :  16 BYTES
NUMBER OF OUTPUT BYTES  :  16 BYTES

ADDRESS                 :  1
SET ADDRESSES WITHIN NETWORK?

YES      NO
```

NETWORK OPENING METHOD IN MANUFACTURING ROBOTS TO A SECOND NETWORK FROM A FIRST NETWORK

BACKGROUND OF THE INVENTION

1. Field of the Invention

The present invention relates to a network opening method in a manufacturing system using robots.

2. Description of the Related Art

In a manufacturing system using robots, particularly, industrial robots (referred to, e.g., as a Flexible Manufacturing System (FMS)), information technology (IT) has been progressed in such a manner that a plurality of robot controllers (or control units) individually connected to a plurality of robots are also connected to various automation apparatuses, such as a programmable controller (PC), a computer, a switch, a sensor, a motor, a hydraulic or pneumatic device, a parts feeder, etc., through a network, so as to carry out a signal and/or data communication, and thus to automatically perform manufacturing, inspection, storage, management, etc., of products.

As a network used in the above-described manufacturing system, there are known (1) an upper network (referred to as an "information network" in the present application) for mainly communicating production control data, design data, logistics data, etc., between computers, and (2) an intermediate or lower network (referred to as a "control network" in the present application) for communicating operation state data, operation instructions, etc., between PCs or between a PC and a robot controller. The lower network also functions as a wire-saving network for connecting respective robot controllers with various input-output units, such as actuators, sensors, etc., and communicating ON/OFF signals, etc. Recently, a manufacturing system, in which a plurality of robot controllers are connected through the information network to a computer in a direct way, so as to facilitate a central management of a plurality of robots, has also appeared.

As a representative example of the information network, there is known the Ethernet (registered trademark) based on IEEE802.3. Also, as the control network, there are known the DeviceNet (registered trademark), the Profibus (registered trademark), the Interbus (registered trademark), the OPCN-1 (registered trademark), etc., each of which seing an open network.

In the manufacturing system using robots, there is a case where a control network must be constructed, in addition to the construction of the information network, for a plurality of robot controllers. When constructing the two systems of networks, conventionally, conditions (such as addresses) required for opening the two networks are respectively set in every one of the robot controllers. According to this conventional network-constructing method, time is spent for opening the two network systems and, as a result, there is worry about a delay in starting a manufacturing system when, e.g., the configuration of the system is changed.

SUMMARY OF THE INVENTION

It is an object of the present invention to provide a network opening method, for a manufacturing system using robots, which is capable of facilitating an opening work of several systems of networks, at the time of connecting a plurality of robot controllers to the several systems of networks.

In order to accomplish the above object, the present invention provides a method of opening a network in a manufacturing system, the system including a plurality of robots, a plurality of robot controllers individually controlling the robots and a plurality of networks connecting the robot controllers with each other, the method comprising opening a first network to the plurality of robot controllers, by setting, in each of the plurality of robot controllers, conditions, including addresses, required for opening the first network; designating an address range prepared in the first network for robot controllers to which a second network is opened and which is selected from among the plurality of robot controllers; and opening the second network to the robot controllers addressed within the address range designated in the first network, by setting, through the first network, conditions required for opening the second network.

In the above method of opening a network, the step of opening the second network may comprise specifying the conditions required for opening the second network, in any one of the robot controllers addressed within the address range as designated.

In this arrangement, the conditions required for opening the second network may include a common condition commonly provided for all of the robot controllers addressed within the address range as designated, the common condition being set in the all of the robot controllers by specifying the common condition in the any one of the robot controllers.

Also, the conditions required for opening the second network may include respective addresses prepared in the second network for the robot controllers addressed within the address range as designated.

BRIEF DESCRIPTION OF THE DRAWINGS

The above and other objects, features and advantages of the present invention will become more apparent from the following description of preferred embodiments in connection with the accompanying drawings, wherein:

FIG. 3 is an illustration showing one example of a condition setting screen used in the network opening method of FIG. 2;

FIG. 4 is an illustration showing another example of a condition setting screen used in the network opening method of FIG. 2;

FIG. 5 is an illustration showing a further example of a condition setting screen used in the network opening method of FIG. 2; and FIG. 6 is an illustration showing a yet further example of a condition setting screen used in the network opening method of FIG. 2.

DETAILED DESCRIPTION

Figure 1:
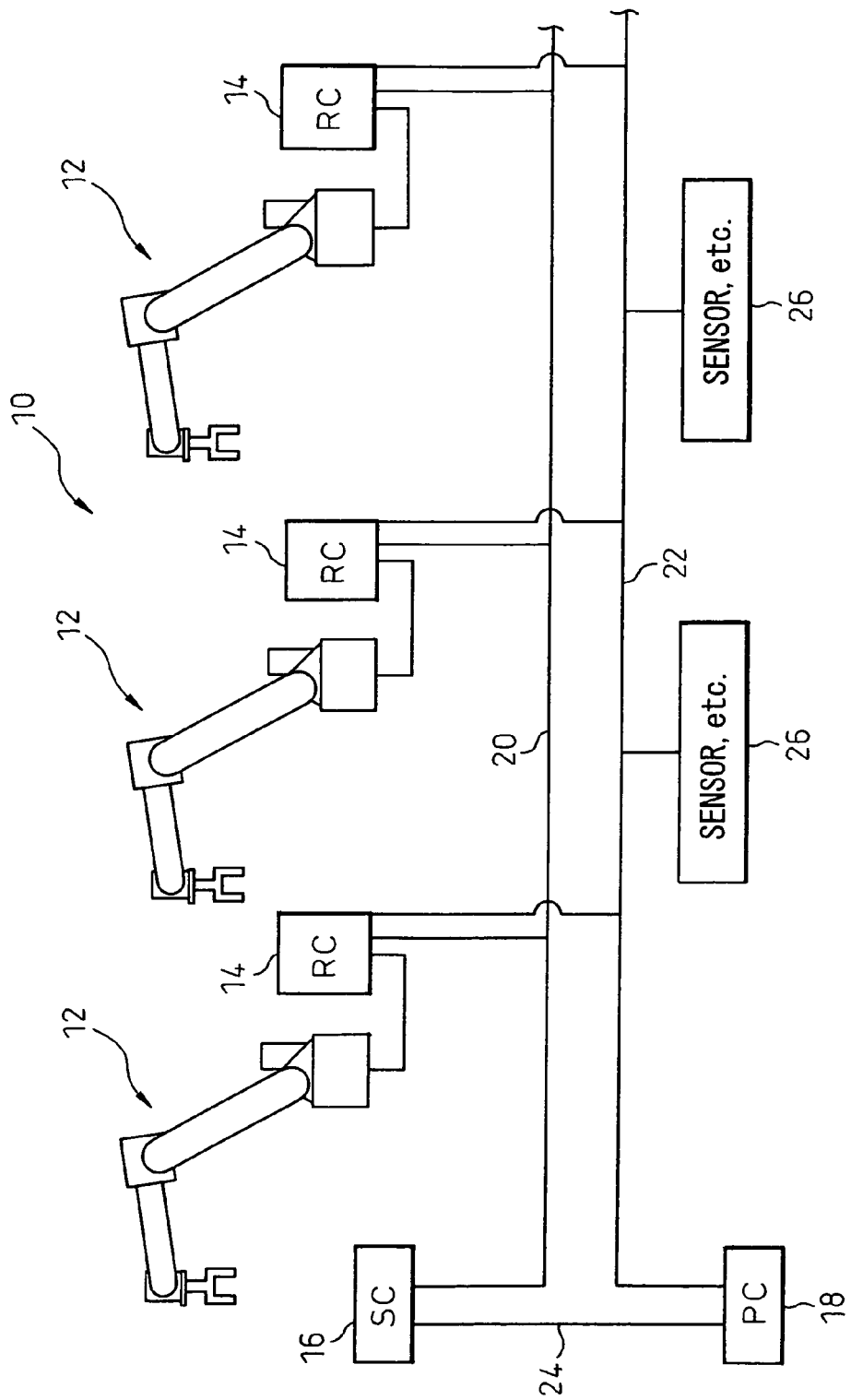
FIG. 1 is a block diagram schematically showing one example of a manufacturing system using industrial robots, to which a network opening method according to the present invention can be applied.

The embodiments of the present invention are described below in detail, with reference to the accompanying drawings. In the drawings, the same or similar components are denoted by common reference numerals.

Referring to the drawings, FIG. 1 schematically shows one example of a manufacturing system using industrial robots (or a Flexible Manufacturing System), to which a network opening method according to the present invention can be applied. The illustrated manufacturing system 10 includes, as major components, a plurality of industrial robots 12 (hereinafter simply referred to as robots 12), a plurality of robot controllers (RC) 14 individually connected to the respective robots 12 and controlling the relevant robots 12, a server computer (SC) 16, a programmable controller (PC) 18, a first network (or an information network) 20 for connecting the server computer 16 with the robot controllers 14, a second network (or a control network) 22 for connecting the programmable controller 18 with the robot controllers 14, and a controller upper link 24 for connecting the server computer 16 with the programmable controller 18.

The manufacturing system 10 may further include a conveying apparatus (not shown), such as a roller conveyer, an automated guided vehicle, a parts feeder, etc., and/or a machine tool (not shown) such as a forming machine. The second control network 22 may be connected with various input-output units 26, such as a switch, a sensor, a measuring instrument, a hydraulic or pneumatic cylinder, a motor, etc. Therefore, the second control network 22 is constructed as a wire-saving network that connects the robot controllers 14 with the various input-output units 26 to communicate ON/OFF signals of the input-output units 26.

For the first information network 20 and the controller upper link 24, a general-purpose interface such as RS-232C or RS-485, or an Ethernet (registered trademark) based on IEEE802.3 may be used. On the other hand, for the second control network 22, a DeviceNet (registered trademark), a Profibus (registered trademark), an Interbus (registered trademark), an OPCN-1 (registered trademark), etc., may be used.

Each robot 12 is configured as an articulated robot and is a machine (i.e., a mechanical section) capable of executing a motion of a robot arm (i.e., a manipulator) under automatic control based on a program or a teaching. Each robot 12 operates under control by the corresponding robot controller 14.

Each robot controller 14 is provided with, although not shown, a communication port for a communication with the robot 12 to be controlled, an input interface for a connection with a sensor or switch provided in the robot 12, a communication port for a communication with the information network 20 and the control network 22, a memory for storing a program or position data instructing the motion of the robot 12 as well as an operation program for the robot controller 14, and a central processing unit (CPU) for control. Each robot controller 14 may also be connected with a teaching panel or pendant (not shown) for carrying out a manual operation and teaching of the robot 12 as well as preparation, editing and management of a somewhat simpler program.

The server computer 16 functions as an upper controller relative to the robot controller 14 and the programmable controller 18. The server computer 16 suitably accesses the respective robot controllers 14 and the programmable controller 18, and executes a changing or setting of a program or position data, a monitoring of the operation state of the whole system or of each robot 12, a management of production result data, etc. The server computer 16 may also be connected with an in-plant local area network (LAN) or an in-company LAN, so as to construct a computer integrated manufacturing (CIM) system for sharing corporate data indirectly related to manufacture, such as logistics, finance, management, etc.

The programmable controller 18 is provided with, although not shown, a communication port for the first and second networks 20, 22, a CPU for control, a memory for storing a sequence control program or various data for the robot 12 as well as an operation program for the programmable controller 18. The programmable controller 18 functions as an upper controller relative to the robot controller 14, and also as a transfer point (or a node) between the first and second networks 20, 22. The programmable controller 18 may transmit a starting signal, for making the respective robots 12 execute desired tasks, to the respective robot controllers 14. It is also possible to designate, by the programmable controller 18, numerical numbers attached to various programs or sub-routines stored in each robot controller 14, so as to make each robot 12 execute a desired operation.

Figure 2:
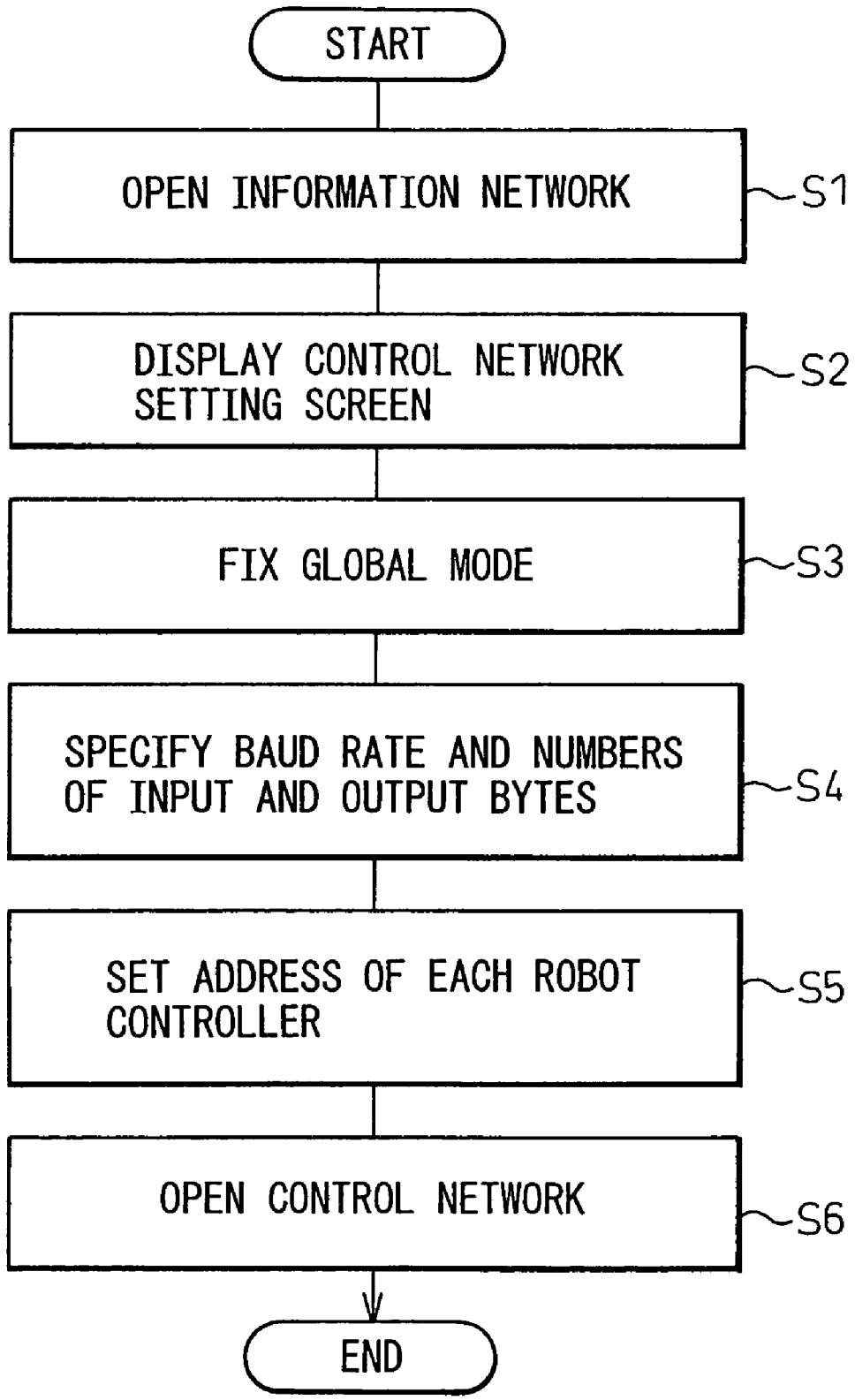
FIG. 2 is a flowchart showing a procedure of a network opening method according to an embodiment of the present invention.

A network opening method, according to one embodiment of the present invention and capable of being performed in the manufacturing system 10 having the above configuration, is explained below with reference to a flowchart shown in FIG. 2 and the setting screens shown in FIGS. 3 to 6.

First, the first information network 20 is opened to all of the robot controllers 14 in the whole system (step S1). This opening work may be carried out by manually setting or determining, in each of the robot controllers 14, various conditions (in general, conditions including addresses and based on the TCP/IP (Transmission Control Protocol/Internet Protocol)) required for opening the first network 20, in accordance with the operation program of each robot controller 14.

Next, one robot controller 14 is optionally selected from among all of the robot controllers 14 in the whole system, and a control-network setting screen 28 (hereinafter referred simply to as a "setting screen 28"; see FIG. 3) stored in a memory is read out, in accordance with the operation program of the selected robot controller 14 (step S2). The setting screen 28 can be displayed on a display unit (not shown) additionally provided for each robot controller 14.

Then, in a first page of the setting screen 28 (FIG. 3), a "global" key 30 is indicated, so as to fix, as a condition setting mode, a global mode used for a condition setting of all of the robot controllers 14 to which the second network 22 is to be opened, but not to fix a local mode used for a condition setting of only the selected robot controller 14 (step S3).

Prior to the above mode fixing, it is possible to designate, on a second page of the setting screen 28 (FIG. 4), a range of addresses prepared in the first network 20 for the robot controllers 14, to which the second network 22 is to be opened, and selected from among all robot controllers 14 of the whole system (i.e., to select the robot controllers 14 to which the second network 22 is to be opened). On the second page, it is also possible to designate a rule for allocating addresses prepared in the second network 22 to the robot controllers 14 to which the second network 22 is to be opened. The address allocation rule will be described later.

Next, on the first page of the setting screen 28 (FIG. 5), a common condition (a baud rate and the numbers of input and output bytes, in the illustrated embodiment) is specified, which is commonly provided for all of the robot controllers 14 to which the second network 22 is to be opened (step S4). The common-condition specification can be executed by indicating a "common setting" key 32 on the setting screen 28, after inputting desired numerical values. When the baud rate and the numbers of input and output bytes are thus specified in one robot controller 14, all of the robot controllers 14 addressed within the address range designated on the second page (FIG. 4) operate to start predetermined processing tasks included in their own operation programs, through the first information network 20, and thus to self-set-or determine the specified baud rate and the specified numbers of input and output bytes.

Next, an "address setting" key 34 is indicated on the first page of the setting screen 28 (FIG. 5), and thereafter a "yes" key 36 is indicated on the first page (FIG. 6). As a result, all of the robot controllers 14 addressed within the address range designated on the second page (FIG. 4) operate to start predetermined processing tasks included in their own operation programs, through the first information network 20, and thus to self-set or determine the addresses in the second control network 22, in accordance with the address allocation rule designated on the second page (FIG. 4) (step S5).

In this connection, the address allocation rule can be selected from the following four rules on the second page of the setting screen 28 (FIG. 4). In the illustrated embodiment, the communication protocols of the first and second networks 20, 22 are TCP/IP, and IP addresses are used as the addresses to be set or determined.

(1) The least significant digits of the IP addresses prepared in the first information network 20 for the respective robot controllers 14 addressed within the designated address range are set or determined as the addresses of those respective robot controllers 14 in the second control network 22.

(2) Respective numbers sequentially increasing from a predetermined starting number (which can be designated on the second page of the setting screen 28 (FIG. 4)), corresponding to an ascending order of the least significant digits of the IP addresses prepared in the first information network 20 for all of the robot controllers 14 addressed within the designated address range are set or determined as the addresses of those respective robot controllers 14 in the second control network 22.

(3) A table showing a correlation between the addresses or node names prepared in the first information network 20 for all of the robot controllers 14 addressed within the designated address range and the addresses previously allocated in the second control network 22 is provided, and the respective addresses of the robot controllers 14 in the second control network 22 are set or determined on the basis of the table.

(4) Respective numbers identical to the IP addresses prepared in the first information network 20 for the robot controllers 14 addressed within the designated address range are set or determined as the respective addresses of the robot controllers 14 in the second control network 22.

After setting the addresses in the second network 22 in an above-described manner, the respective robot controllers 14 restart the network processing tasks included in their own operation programs. After completing the restart, the second control network 22 is opened (step S6).

According to the network opening method as described above, in order to connect the robot controllers 14 with the two systems of networks 20, 22, it is possible to execute, after the first network 20 is opened, the setting of the conditions in all of the robot controllers 14, through the first network 20, by specifying the conditions required for opening the second network 22 in any one robot controller 14 selected from among the robot controllers to which the second network 22 is to be opened, in contrast to the conventional methods in which the setting of the conditions required for opening two networks is individually executed in every one of all robot controllers 14. Therefore, the opening work of the two systems of networks can be extremely facilitated.

Also, in the above network opening method, if troubles, such as a communication fault, occur in any one of the robot controllers 14 at the time of opening the second network 22 by using the first network 20, one robot controller 14, used for the condition specification, is capable of promptly obtaining error information indicating the troubles through the first network 20. Therefore, the operator can take proper countermeasures based on the obtained error information and thus can resolve the troubles easily and promptly through the first network 20, without going to the operating site of the manufacturing system 10 for inspection or resetting. Further, according to the above network opening method, the condition setting for all of the robot controllers 14, to which the second network 22 is to be opened, can be collectively performed in a single screen 28, so that errors such as repeated address settings can be surely avoided. It should be noted that the network opening method according to the present invention can also be applied to a configuration such that three or more systems of networks are constructed for a plurality of robots.

As will be apparent from the above explanation, according to the present invention, at the time of connecting a plurality of robot controllers to the several systems of networks, it is possible to set or determine, after a first network is opened, conditions required for opening a second network, through the first network, for the robot controllers to which the second network is to be opened, and thereby to open the second network. Therefore, it is possible to facilitate an opening work of several systems of networks. Also, if troubles such as a communication fault occur in any one robot controller at the time of opening the second network using the first network, error information indicating this trouble can be obtained instantly through the first network. Therefore, the operator can take proper countermeasures based on the obtained error information and thus can resolve the troubles easily and promptly through the first network, without going to the operating site of the manufacturing system for inspection or resetting.

In the configuration wherein conditions (such as common conditions) for all of the robot controllers can be set or determined by executing a condition specification in any one robot controller selected from the robot controllers to which the second network is opened, it is possible to readily open the second network, while surely preventing errors in condition setting, such as repeated address settings, from occurring.

While the invention has been described with reference to specific preferred embodiments, it will be understood, by those skilled in the art, that various changes and modifications may be made thereto without departing from the scope of the following claims.

The invention claimed is:

1. A method of opening a network in a manufacturing system, the system including a plurality of robots, a plurality of robot controllers individually controlling the robots and two different networks connecting the robot controllers with each other, the method comprising:

opening a first network to said plurality of robot controllers, by setting, in each of said plurality of robot controllers and in accordance with an operation program of each said robot controller, conditions required for opening said first network, wherein said conditions include addresses and are based on the Transmission Control Protocol/Internet Protocol (TCP/IP);

designating, on a control-network setting screen, an address range in said first network for robot controllers to which a second network is to be opened and which are selected from among said plurality of robot controllers;

determining and setting, in accordance with an address allocation rule, addresses in said second network for said selected robot controllers which are addressed in said first network within the designated address range;

restarting network processing tasks included in operation programs of said selected robot controllers which are addressed in said first network within the designated address range; and after (i) said first network has been opened, (ii) said addresses in said second network have been set for said selected robot controllers, and (iii) said restarting has been completed, opening said second network to said selected robot controllers which are addressed in said first network within the designated address range.

2. A method as set forth in claim 1, further comprising:
after said designating said address range in said first network, specifying a baud rate, a number of input bytes and a number of output bytes required for opening said second network, in any one of said selected robot controllers.

3. A method as set forth in claim 2, wherein said baud rate, number of input bytes and number of output bytes required for opening said second network are
(a) commonly provided for all of said selected robot controllers, and
(b) set in all said selected robot controllers by said specifying said common baud rate, number of input bytes and number of output bytes in said any one of said selected robot controllers.

4. A method as set forth in claim 1, wherein
said addresses set in said first network for said plurality of robot controllers comprise IP addresses; and
said address allocation rule comprises setting respective least significant digits of said IP addresses set in said first network for said selected robot controllers as said respective addresses of said selected robot controllers in said second network.

5. A method as set forth in claim 1, wherein
said addresses set in said first network for said plurality of robot controllers comprise IP addresses; and
said address allocation rule comprises setting respective numbers sequentially increasing from a predetermined starting number, in an ascending order of least significant digits of said IP addresses set in said first network for all of said selected robot controllers, as said respective addresses of said selected robot controllers in said second network.

6. A method as set forth in claim 1, wherein said address allocation rule comprises
providing a table which correlates (1) said addresses or node names set in said first network for all of said selected robot controllers and (2) said addresses previously allocated in said second network for all of said selected robot controllers, and
setting said respective addresses of said selected robot controllers in said second network based on said table.

7. A method as set forth in claim 1, wherein said address allocation rule comprises
setting respective numbers identical to said addresses set in said first network for said selected robot controllers as said respective addresses of said selected robot controllers in said second network.

8. A method as set forth in claim 1, wherein said second network comprises a control network for connecting said plurality of robot controllers with an input-output unit and communicating ON/OFF signals of said input-output unit.

* * * * *